US009790416B2

(12) United States Patent
Kuri et al.

(10) Patent No.: US 9,790,416 B2
(45) Date of Patent: Oct. 17, 2017

(54) DRILLING FLUID COMPOSITIONS AND METHODS FOR USE THEREOF IN SUBTERRANEAN FORMATIONS

(71) Applicant: Halliburton Energy Services, Inc., Houston, TX (US)

(72) Inventors: Laura P. Kuri, Houston, TX (US); Charles Landis, Houston, TX (US); Ryan Collins, Houston, TX (US); David M. Donald, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/664,042

(22) Filed: Oct. 30, 2012

(65) Prior Publication Data

US 2014/0121134 A1    May 1, 2014

(51) Int. Cl.
*C09K 8/10* (2006.01)
*C09K 8/04* (2006.01)
*C09K 8/50* (2006.01)
*C09K 8/57* (2006.01)
*C09K 8/62* (2006.01)

(52) U.S. Cl.
CPC ............... *C09K 8/04* (2013.01); *C09K 8/50* (2013.01); *C09K 8/57* (2013.01); *C09K 8/62* (2013.01)

(58) Field of Classification Search
CPC . C09K 8/58; C09K 8/584; C09K 8/62; C09K 8/805; C09K 8/32; C09K 8/34; C09K 8/536; C09K 8/60; C09K 8/605; C09K 8/80; C09K 8/845; C09K 8/08; C09K 8/206; C09K 8/90; C09K 2208/18; C09K 8/514; C09K 8/035; C09K 2208/12; C09K 2208/22; C09K 2208/32; C09K 8/03; C09K 8/18; C09K 8/36; C09K 8/506; C09K 8/524; C09K 8/88; C09K 2208/30; C09K 8/06; C09K 8/10; C09K 8/22; Y10S 507/925; Y10S 507/922; Y10S 507/926; Y10S 507/933; Y10S 507/903
See application file for complete search history.

(56) References Cited

U.S. PATENT DOCUMENTS

| | | | |
|---|---|---|---|
| 3,865,240 A * | 2/1975 | Schick | B03D 3/06 106/DIG. 4 |
| 4,015,991 A | 4/1977 | Persinski et al. | |
| 4,155,410 A | 5/1979 | Jackson et al. | |
| 4,422,947 A * | 12/1983 | Dorsey | C09K 8/08 507/110 |
| 4,440,649 A * | 4/1984 | Loftin et al. | 507/121 |
| 4,515,635 A | 5/1985 | Rao et al. | |
| 4,555,269 A | 11/1985 | Rao et al. | |
| 4,585,064 A | 4/1986 | Graham et al. | |
| 4,670,501 A | 6/1987 | Dymond et al. | |
| 4,676,317 A | 6/1987 | Fry et al. | |
| 4,703,801 A | 11/1987 | Fry et al. | |
| 4,982,793 A | 1/1991 | Holtmyer et al. | |
| 5,067,565 A | 11/1991 | Holtmyer et al. | |
| 5,122,549 A | 6/1992 | Holtmyer et al. | |
| 5,249,627 A | 10/1993 | Harms et al. | |
| 5,339,903 A | 8/1994 | Eoff et al. | |
| 5,775,425 A | 7/1998 | Weaver et al. | |
| 5,833,000 A | 11/1998 | Weaver et al. | |
| 5,839,510 A | 11/1998 | Weaver et al. | |
| 5,853,048 A | 12/1998 | Weaver et al. | |
| 6,268,406 B1 | 7/2001 | Chatterji et al. | |
| 6,287,639 B1 | 9/2001 | Schmidt et al. | |
| 6,311,773 B1 | 11/2001 | Todd et al. | |
| 6,439,309 B1 | 8/2002 | Matherly et al. | |
| 6,582,819 B2 | 6/2003 | McDaniel et al. | |
| 6,677,426 B2 | 1/2004 | Noro et al. | |
| 6,818,596 B1 * | 11/2004 | Hayes | C09K 8/24 507/103 |
| 7,131,491 B2 | 11/2006 | Blauch et al. | |
| 7,153,575 B2 | 12/2006 | Anderson et al. | |
| 7,238,733 B2 | 7/2007 | Vijn et al. | |
| 7,350,579 B2 | 4/2008 | Gatlin et al. | |
| 7,351,680 B2 * | 4/2008 | Hayes | C09K 8/03 166/305.1 |
| 7,392,847 B2 | 7/2008 | Gatlin et al. | |
| 7,673,686 B2 | 3/2010 | Nguyen et al. | |
| 7,757,766 B2 | 7/2010 | Lewis et al. | |
| 7,819,192 B2 | 10/2010 | Weaver et al. | |
| 7,825,074 B2 | 11/2010 | Schmidt et al. | |
| 7,833,944 B2 * | 11/2010 | Munoz | C09K 8/035 166/278 |

(Continued)

FOREIGN PATENT DOCUMENTS

GB     2221940 A     2/1990

OTHER PUBLICATIONS

Maris International Ltd, Continuous circulation drilling, Jul. 2009.*
http://en.wikipedia.org/wiki/Bentonite; downlod dated Jan. 23, 2014.*
CP Kelco Xanthan Gum product data sheet.*
http://www.californiaearthminerals.com/edible-clays.html downloaded on Oct. 22, 2015.*
CP Kelco Xanthan Gum product data sheet, http://www.cpkelco.com/products-xanthan-gum.html downloaded on Jan. 11, 2014.*
Appendix W American Indian Tribal Perspectives and Scenarios, 2007.*
http://www.californiaearthminerals, com/edible-clays.html downloaded on Oct. 22, 2015.*

(Continued)

*Primary Examiner* — Kumar R Bhushan
(74) *Attorney, Agent, or Firm* — McDermott Will & Emery LLP

(57) ABSTRACT

A method comprising drilling a wellbore into a subterranean formation; providing a drilling fluid comprising an aqueous base fluid and a property control package, the property control package comprising: a stabilizing agent; a filtration control agent; and a suspension enhancer; introducing the drilling fluid into the wellbore in the subterranean formation; and continuously circulating the drilling fluid during the drilling of the wellbore.

4 Claims, No Drawings

(56) References Cited

U.S. PATENT DOCUMENTS

| | | | |
|---|---|---|---|
| 7,956,017 B2 | 6/2011 | Gatlin et al. | |
| 8,003,579 B2 | 8/2011 | Akarsu et al. | |
| 8,076,271 B2 | 12/2011 | Blauch et al. | |
| 8,136,595 B2 | 3/2012 | Weaver et al. | |
| 8,168,739 B2 | 5/2012 | Kitamura et al. | |
| 8,261,833 B2 | 9/2012 | Nguyen et al. | |
| 2005/0003967 A1* | 1/2005 | Rea | C09K 8/145 |
| | | | 507/200 |
| 2007/0135312 A1 | 6/2007 | Melbouci | |
| 2007/0289781 A1 | 12/2007 | Rickman et al. | |
| 2008/0006405 A1 | 1/2008 | Rickman et al. | |
| 2010/0160187 A1 | 6/2010 | Nguyen et al. | |
| 2010/0179281 A1 | 7/2010 | Nilsen | |
| 2011/0039737 A1 | 2/2011 | Schmidt et al. | |
| 2011/0098394 A1 | 4/2011 | Schmeltzer et al. | |
| 2011/0168449 A1* | 7/2011 | Dusterhoft et al. | 175/72 |
| 2012/0003328 A1* | 1/2012 | Zheng | A61K 33/12 |
| | | | 424/683 |

OTHER PUBLICATIONS

Halad®-344 Fluid Loss Additive Product Sheet, 2007.
International Search Report and Written Opinion for PCT/US2012/062590 dated Jul. 18, 2013.

\* cited by examiner

DRILLING FLUID COMPOSITIONS AND METHODS FOR USE THEREOF IN SUBTERRANEAN FORMATIONS

BACKGROUND

The present invention generally relates to drilling fluids, and more specifically, to methods for drilling in a subterranean formation and drilling fluid compositions adapted for the same.

Subterranean wells are drilled for a number of applications, including oil and gas exploration (e.g., wireline core drilling), water exploration, and mineral exploration. In a typical drilling operation, drilling fluid is used during drilling, for example, to control formation pressures, seal permeable formations (e.g., form a filter cake), remove cuttings from the well, and cool and lubricate the drill bit. Although the function of the drilling fluid is generally the same across all applications (e.g., oil and gas, water, and mining), the properties of the drilling fluid must be adapted to each particular application. For example, mining applications, particularly mining exploration applications, tend to involve smaller wellbores and, thus, smaller drill bits, than oil and gas applications. Moreover, drilling during mining exploration tends to involve highly mineralized formations and the integrity, pH, and temperature of these formations may be vastly variable. Moreover, drilling during mining exploration is characterized by and small annular spaces between the formation and the drilling apparatus. Therefore, such applications may require less viscous drilling fluids such that the pressure exerted by the drilling fluid does not damage the formation or drilling fluids that do not vary in its consistency with changing pH or temperature.

Traditional drilling fluids use clay derivatives (e.g., bentonite) that help build the filter cake and control water loss during drilling. They can also be used to suspend cuttings created during drilling and carry them out of the wellbore. However, clay derivatives alone can become too viscous to be adequately pumped and can produce a thick, unstable filter cake, which can create undesirable drag during drill bit pullback. Therefore, suspension enhancers are often added to drilling fluids with clay derivatives in order to reduce the amount of clay derivatives that must be used. In some instances, suspension enhancers additionally serve as water loss reducers. In traditional drilling fluids, suspension enhancers are not used in drilling fluids alone because they do not provide adequate fluid loss control or filter cake production in all formation and water types.

Traditional drilling fluids must be prepared on site in order to account for the variability in formation properties and which may significantly delay drilling operations. Additionally, a particular order of operations for including additives is necessary to ensure that the drilling fluid functions properly for the particular application. For example, if a drilling fluid contains a clay derivative and suspension enhancer (e.g., polymer), it is necessary to hydrate the clay derivative before adding the suspension enhancer in order to ensure that the clay derivative is capable of maximum swelling. If the suspension enhancer is added to a drilling fluid before the clay derivative, the suspension enhancer will interfere with the grains of the clay derivative and prevent it from properly swelling, thereby rendering the drilling fluid less effective. Moreover, the suspension enhancers selected for use in a drilling fluid must be compatible with the particular application (e.g., a polymer that loses its water loss control capacity at high temperatures should not be used in a formation that has high temperature intervals). Also, operator error in mixing drilling fluids tends to lead to inconsistent blends.

SUMMARY OF THE INVENTION

The present invention generally relates to drilling fluids, and more specifically, to methods for drilling in a subterranean formation and drilling fluid compositions adapted for the same.

In some embodiments, the present invention provides a method comprising: drilling a wellbore into a subterranean formation; providing a drilling fluid comprising an aqueous base fluid and a property control package, the property control package comprising: a stabilizing agent; a filtration control agent; and a suspension enhancer; introducing the drilling fluid into the wellbore in the subterranean formation; and continuously circulating the drilling fluid during the drilling of the wellbore.

In other embodiments, the present invention provides a method comprising: drilling a wellbore into a subterranean formation; providing a drilling fluid comprising an aqueous base fluid and a property control package, the property control package comprising: a clay derivative; a stabilizing agent; a filtration control agent; and a suspension enhancer; introducing the drilling fluid into the wellbore in the subterranean formation; and continuously circulating the drilling fluid during the drilling of the wellbore.

In still other embodiments, the present invention provides a method comprising: drilling a wellbore into a subterranean formation; providing a drilling fluid comprising an aqueous base fluid and a property control package, the property control package comprising: a clay derivative present in the range from about 0% to about 95% by dry weight of the property control package, wherein the clay derivative is selected from the group consisting of: a kaolinite clay derivative; a montmorillonite clay derivative; a illite clay derivative; a chlorite clay derivative; and any combination thereof; a stabilizing agent present in the range from about 0% to about 75% by dry weight of the property control package, wherein the stabilizing agent is selected from the group consisting of: a non-aqueous tackifying agent; an aqueous tackifying agent; an emulsified tackifying agent; a silyl-modified polyamide compound; a resin; a crosslinkable aqueous polymer composition; a polymerizable organic monomer composition; a stabilizing agent emulsion; a zeta-potential modifying aggregating composition; a silicon-based resin; a binder; any derivative thereof; and any combination thereof; a filtration control agent present in the range from about 0% to about 50% by dry weight of the property control package, wherein the filtration control agent is: a cellulose derivative; a latex polymer; a copolymer of acrylamido-2-methyl-2-propanesulfonic acid; any derivative thereof; and any combination thereof; and a suspension enhancer present in the range from about 0% to about 35% by dry weight of the property control package, wherein the suspension enhancer is selected from the group consisting of: naturally-occurring gelling agents; synthetic gelling agents; and any combination thereof; introducing the drilling fluid into the wellbore in the subterranean formation; and continuously circulating the drilling fluid during the drilling of the wellbore.

The features and advantages of the present invention will be readily apparent to those skilled in the art upon a reading of the description of the preferred embodiments that follows.

DETAILED DESCRIPTION

The present invention generally relates to drilling fluids, and more specifically, to methods for drilling in a subterranean formation and drilling fluid compositions adapted for the same.

In order to address the difficulties associated with drilling fluids used in drilling operations in variable subterranean formations and for variable applications, the present invention provides a combination of additives that may be added as a property control package to desirably change the properties of a drilling aqueous base fluid in a synergistic manner. The property control packages described herein improve the ease with which the drilling fluid may be prepared and introduced into the wellbore as well as their use in various formation conditions (e.g., temperature and pH). Altering these factors in concert with one another may address the particular difficulties associated with traditional drilling fluids.

To facilitate the ease of preparing and introducing the drilling fluids into a wellbore (e.g., the ease of pumping), the property control packages described herein contain a filtration control agent. The filtration control agent helps to maintain the fluidity of the drilling fluid by reducing water loss to the formation. In addition, the filtration control agent desirably maintains sufficient water in the drilling fluids for effective lubrication and cooling of the drill bit during drilling operations.

Despite the foregoing advantages of the filtration control agent, the presence of the filtration control agent may decrease the ability of the drilling fluids of the present invention to suspend cuttings and carry them to the head of the wellbore. Therefore, in addition to the filtration control agent, the property control packages of the present invention also include a suspension enhancer. The suspension enhancer may work in concert with the filtration control agent to increase the viscosity of the drilling fluid while providing adequate fluid loss control.

The property control packages of the present invention may contain clay derivatives and/or suspension enhancers. Although clay derivatives and suspension enhancers have not previously been admixed together prior to their hydration because the suspension enhancers interact with the clay derivatives to hinder their swelling ability, the clay derivatives in the property control packages of the present invention may be admixed with the suspension enhancers without interfering with the swelling of the clay derivatives. The novel clay derivatives in the property control packages described herein are finely ground which unexpectedly prevents the suspension enhancers from interacting preferred swelling amount without first hydrating them before adding the suspension enhancers. Property control packages containing suspension enhancers and no clay derivatives may be beneficial for drilling small wellbores (i.e., during mineral exploration operations) because the suspension enhancers may impart water loss and sufficient viscosity, without being overly thick as it would be with clay derivatives admixed.

Although the foregoing additives of the property control packages of the present invention may impart the advantages described herein to a drilling fluid when used in combination with one another, they are not believed to chemically interact directly with one another, either positively or negatively, particularly in a dry or powdered state, thereby allowing their ready combination with one another for later inclusion in a drilling aqueous base fluid.

In some embodiments, the present invention provides for a method comprising: drilling a wellbore into a subterranean formation; providing a drilling fluid comprising an aqueous base fluid and a property control package, the property control package comprising: a stabilizing agent; a filtration control agent; and a suspension enhancer; introducing the drilling fluid into the wellbore in the subterranean formation; and continuously circulating the drilling fluid during the drilling of the wellbore. In other embodiments, the present invention provides for a method comprising: drilling a wellbore into a subterranean formation; providing a drilling fluid comprising an aqueous base fluid and a property control package, the property control package comprising: a clay derivative; a stabilizing agent; a filtration control agent; and a suspension enhancer; introducing the drilling fluid into the wellbore in the subterranean formation; and continuously circulating the drilling fluid during the drilling of the wellbore.

I. Aqueous Base Fluid

The aqueous base fluid for use in the drilling fluids of the present invention may be any aqueous fluid suitable for use in subterranean drilling applications. Suitable aqueous base fluids may include, but are not limited to, fresh water, saltwater (e.g., water containing one or more salts dissolved therein), brine (e.g., saturated salt water), seawater, or combinations thereof. Generally, the water may be from any source, provided that it does not contain components that might adversely affect the stability and/or performance of the drilling fluids of the present invention. In certain embodiments, the density of the aqueous base fluid can be adjusted, among other purposes, to provide additional particulate transport and suspension in the aqueous base fluids used in the methods of the present invention. In certain embodiments, the pH of the aqueous base fluid may be adjusted (e.g., by a buffer or other pH adjusting agent), among other purposes, to activate a crosslinking agent (e.g., the suspension enhancer) and/or to reduce the viscosity of the drilling fluids (e.g., activate a breaker, deactivate a crosslinking agent). In these embodiments, the pH may be adjusted to a specific level, which may depend on, among other factors, the component properties of the property control package of the drilling fluid and/or the properties of the formation itself. In some embodiments, the pH range may preferably be from about 4 to about 11. One of ordinary skill in the art, with the benefit of this disclosure, will recognize the type of aqueous base fluid to use in a particular drilling operation and when density and/or pH adjustments are appropriate.

II. Property Control Package—Clay Derivative

Any suitable clay derivative that is capable of imparting a viscosity to the drilling fluids of the present invention in order to aid in controlling fluid loss and building a suitable filter cake along the face of a subterranean formation may be used in the property control packages of the present invention. Suitable examples of clay derivatives may include, but are not limited to, the derivatives of kaolinite clay, montmorillonite clay, illite clay, chlorite clay, and combinations thereof. In preferred embodiments, the clay derivative is comprised of a montmorillonite clay, such as bentonite. In some embodiments, the clay derivative is present in an amount in the range of from about 0% to about 95% by dry weight of the property control package. In preferred embodiments, the clay derivative is present in an amount in the range of from about 70% to about 95% by dry weight of the property control package.

The clay derivatives of the present invention may include any impurities such as, for example, organic matter (e.g., humus, carbonaceous shale), fossilized matter, lime carbonate, iron oxides, iron sulfides, rock salt, wavellite, and sand. Impurities may be present in the clay derivatives of the present invention in an amount from less than about 20% by dry weight of the clay derivative. Preferably, impurities are present in the clay derivatives of the present invention in an amount from less than about 10% by dry weight of the clay derivative.

III. Property Control Package—Stabilizing Agent

The stabilizing agent of the property control packages of the present invention may be used to control the swelling of the clay derivative in order to reach a preferred swelling amount and to reduce the clay derivatives migration into formation pores. It may also serve to adhere to formation fines or formation cuttings created during drilling operations to aide in carrying them to the surface for removal. Suitable stabilizing agents for use in the property control packages of the present invention may include, but are not limited to, non-aqueous tackifying agents, aqueous tackifying agents, emulsified tackifying agents, silyl-modified polyamide compounds, resins, crosslinkable aqueous polymer compositions, polymerizable organic monomer compositions, stabilizing agent emulsions, zeta-potential modifying aggregating compositions, silicon-based resins, and binders. Combinations and/or derivatives of these also may be suitable. Nonlimiting examples of suitable non-aqueous tackifying agents may be found in U.S. Pat. Nos. 7,392,847, 7,350,579, 5,853,048; 5,839,510; and 5,833,000, the entire disclosures of which are herein incorporated by reference. Nonlimiting examples of suitable aqueous tackifying agents may be found in U.S. Pat. Nos. 8,076,271, 7,131,491, 5,249,627 and 4,670,501, the entire disclosures of which are herein incorporated by reference. Nonlimiting examples of suitable crosslinkable aqueous polymer compositions may be found in U.S. Patent Application Publication Nos. 2010/0160187 and U.S. Pat. No. 8,136,595 the entire disclosures of which are herein incorporated by reference. Nonlimiting examples of suitable silyl-modified polyamide compounds may be found in U.S. Pat. No. 6,439,309 entitled the entire disclosure of which is herein incorporated by reference. Nonlimiting examples of suitable resins may be found in U.S. Pat. Nos. 7,673,686; 7,153,575; 6,677,426; 6,582,819; 6,311,773; and 4,585,064 as well as U.S. Patent Application Publication No. and 2008/0006405 and U.S. Pat. No. 8,261,833, the entire disclosures of which are herein incorporated by reference. Nonlimiting examples of suitable polymerizable organic monomer compositions may be found in U.S. Pat. No. 7,819,192, the entire disclosure of which is herein incorporated by reference. Nonlimiting examples of suitable stabilizing agent emulsions may be found in U.S. Patent Application Publication No. 2007/0289781 the entire disclosure of which is herein incorporated by reference. Nonlimiting examples of suitable zeta-potential modifying aggregating compositions may be found in U.S. Pat. Nos. 7,956,017 and 7,392,847, the entire disclosures of which are herein incorporated by reference. Nonlimiting examples of suitable silicon-based resins may be found in Application Publication Nos. 2011/0098394, 2010/0179281, and U.S. Pat. Nos. 8,168,739 and 8,261,833, the entire disclosures of which are herein incorporated by reference. Nonlimiting examples of suitable binders may be found in U.S. Pat. Nos. 8,003,579; 7,825,074; and 6,287,639, as well as U.S. Patent Application Publication No. 2011/0039737, the entire disclosures of which are herein incorporated by reference. It is within the ability of one skilled in the art, with the benefit of this disclosure, to determine the type and amount of stabilizing agent to include in the methods of the present invention to achieve the desired results. In some embodiments, the stabilizing agent is present in an amount in the range of from about 0% to about 75% by dry weight of the property control package, depending on the presence of a clay derivative. In preferred embodiments, the stabilizing agent is present in an amount in the range of from about 50% to about 2% by dry weight of the property control package, depending on the presence of a clay derivative. One skilled in the art, with the benefit of this disclosure, will recognize the amount of stabilizing agent to include in the property control packages of the present invention for use in a particular application.

IV. Property Control Package—Filtration Control Agent

Filtration control agents suitable for use in the embodiments of the present invention are not believed to be particularly limited and may include any type of substance capable of providing fluid loss control. The form of the filtration control agent may comprise various forms such as, for example, fibers, flakes, sheets, powders, crystalline solids, and the like. Suitable filtration control agents may comprise cellulose derivatives (e.g., modified guars, hydroxyethylcellulose, carboxymethylcellulose, carboxymethyl hydroxyethyl cellulose), latex polymers, and copolymers of acrylamido-2-methyl-2-propanesulfonic acid, particularly copolymers with N,N-dimethylacrylamide. Suitable copolymers of acrylamido-2-methyl-2-propanesulfonic acid that may be used for filtration control are described in U.S. Pat. Nos. 4,015,991, 4,515,635, 4,555,269, 4,676,317, 4,703,801, 5,339,903, and 6,268,406, each of which is incorporated herein by reference in its entirety. One example of a suitable filtration control additive that may be used in the embodiments described herein is HALAD-344, which is commercially available from Halliburton Energy Services. In some embodiments, the filtration control agent is present in an amount in the range of from about 0% to about 50% by dry weight of the property control package, depending on the presence of a clay derivative. In preferred embodiments, the filtration control agent is present in an amount in the range of from about 2% to about 35% by dry weight of the property control package, depending on the presence of a clay derivative. One skilled in the art, with the benefit of this disclosure, will recognize the amount of filtration control agent to include in the property control packages of the present invention for use in a particular application.

V. Property Control Package—Suspension Enhancer

The suspension enhancers suitable for use in the present invention may comprise any substance of polymeric material capable of increasing the viscosity of the treatment fluid. In certain embodiments, the suspension enhancer may comprise one or more polymers that have at least two molecules that are capable of forming a crosslink in a crosslinking reaction in the presence of a crosslinking agent, and/or polymers that have at least two molecules that are so crosslinked (i.e., a crosslinked gelling agent). The suspension enhancers may be naturally-occurring gelling agents, synthetic gelling agents, or a combination thereof. The suspension enhancers also may be cationic gelling agents, anionic gelling agents, or a combination thereof. Suitable suspension enhancers include, but are not limited to, polysaccharides, biopolymers, and/or derivatives thereof that contain one or more of these monosaccharide units: galactose, mannose, glucoside, glucose, xylose, arabinose, fructose, glucuronic acid, or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), xanthan, scleroglucan, succinoglycan, diutan, and combinations thereof. In certain embodiments, the gelling agents comprise an organic carboxylated polymer, such as CMHPG.

Suitable synthetic polymers include, but are not limited to, 2,2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamido- and methacrylamido-alkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, and derivatives and combinations thereof. In certain embodiments, the suspension enhancer comprises an acrylamide/2-(methacryloyloxy)ethyltrimethylammonium methyl sulfate copolymer. In certain embodiments, the suspension enhancer may comprise an acrylamide/2-(methacryloyloxy)ethyltrimethylammonium chloride copolymer. In certain embodiments, the suspension enhancer may comprise a derivatized cellulose that comprises cellulose grafted with an allyl or a vinyl monomer, such as those disclosed in U.S. Pat. Nos. 4,982,793, 5,067,565, and 5,122,549, the entire disclosures of which are incorporated herein by reference.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as suspension enhancers.

The suspension enhancer may be present in the property control package of the present invention in an amount sufficient to provide the desired viscosity to the drilling fluid. In some embodiments, the suspension enhancers (i.e., the polymeric material) may be present in an amount in the range of from about 0% to about 35% by dry weight of the property control package, depending on the presence of a clay derivative. In preferred embodiments, the suspension enhancers may be present in an amount in the range of from about 1% to about 25% by dry weight of the property control package, depending on the presence of a clay derivative. One skilled in the art, with the benefit of this disclosure, will recognize the amount of suspension enhancer to include in the property control packages of the present invention for use in a particular application.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:
1. A method comprising:
    drilling a wellbore into a subterranean formation;
    providing a drilling fluid comprising an aqueous base fluid;
    providing a property control package in a dry state, the property control package comprising:
        a finely ground clay derivative present in an amount in a range from about 70% to about 95% by dry weight of the property control package, wherein the finely ground clay derivative comprises a montmorillonite clay and comprises less than 10% impurities by dry weight of the clay derivative;
        a stabilizing agent, wherein the stabilizing agent is present in an amount in a range of from about 0.01% to 2% by dry weight of the property control package and the stabilizing agent comprises a partially hydrolyzed polyacrylamide;
        a filtration control agent, wherein the filtration control agent comprises a cellulose derivative; and
        a suspension enhancer, wherein the suspension enhancer does not interact with the finely ground clay derivative to hinder swelling of the finely ground clay derivative;
    introducing the property control package into the drilling fluid;
    introducing the drilling fluid comprising the property control package into the wellbore in the subterranean formation; and
    continuously circulating the drilling fluid during the drilling of the wellbore.

2. The method of claim 1, wherein the aqueous base fluid is selected from the group consisting of: fresh water, saltwater, brine, seawater, and any combination thereof.

3. A method comprising:
   drilling a wellbore into a subterranean formation;
   providing a drilling fluid comprising an aqueous base fluid;
   providing a property control package in a dry state, the property control package consisting essentially of:
   a finely ground clay derivative present in the range from about 70% to about 95% by dry weight of the property control package, wherein the finely ground clay derivative is a montmorillonite clay;
   wherein the finely ground clay derivative comprises less than about 5% impurities by dry weight of the clay derivative;
   a stabilizing agent, wherein the stabilizing agent includes a partially hydrolyzed polyacrylamide;
   a filtration control agent, wherein the filtration control agent includes a cellulose derivative; and
   a suspension enhancer, wherein the suspension enhancer does not interact with the finely ground clay derivative to hinder swelling of the finely ground clay derivative;
   introducing the property control package into the drilling fluid;
   introducing the drilling fluid comprising the property control package into the wellbore in the subterranean formation; and
   continuously circulating the drilling fluid during the drilling of the wellbore.

4. The method of claim 3, wherein the aqueous base fluid is selected from the group consisting of: fresh water, saltwater, brine, seawater, and any combination thereof.

\* \* \* \* \*